United States Patent [19]
Ferré

[11] 3,757,285
[45] Sept. 4, 1973

[54] ACOUSTIC RANGE MEASURING DEVICE

[76] Inventor: Radford G. Ferré, 8254 Ashley Cir., Sandy, Utah 84070

[22] Filed: July 22, 1971

[21] Appl. No.: 165,232

[52] U.S. Cl. .................. 340/1 C, 340/3 R, 343/7 A, 343/17
[51] Int. Cl. ............................................. G01s 9/66
[58] Field of Search ............................ 340/1 C, 3 R; 343/17, 7, 7 A

[56] References Cited
UNITED STATES PATENTS

| | | | |
|---|---|---|---|
| 3,588,795 | 6/1971 | Linardos et al. ..................... | 340/1 C |
| 3,528,053 | 9/1970 | Rubin ................................. | 340/1 C |
| 3,623,092 | 11/1971 | Farnsworth ........................ | 343/7 A |

Primary Examiner—Benjamin A. Borchelt
Assistant Examiner—N. Moskowitz
Attorney—Mallinckrodt & Cornaby

[57] ABSTRACT

An acoustic range measuring device, utilizing an electronic counter to determine the number of pulses from a reference oscillator that occur in the time interval between the transmitting and return of an acoustic pulse from a transducer is capable of direct connection to digital computers and digital controllers and is provided with logic circuits to automatically check validity of the count and with other logic circuits to provide an output signal indicative of the distance from the transducer to an obstruction (an object or a solid or liquid material) in the path of the acoustic pulse if valid information has been received, or to provide a signal indicating that valid information has not been received. The device can be provided with a second transducer and electronic circuitry to automatically compensate, by changing the frequency of the reference oscillator, for any changes in the acoustic pulse velocity that might occur due to changes in temperature, humidity, pressure, etc., in the medium. The device may also be provided with electronic circuitry for producing an alarm signal if the measured distance is not within a pre-set range. Further, the device may be provided with logic and electronic circuitry enabling it to sequentially operate a multiplicity of transducers, and to provide an output signal for each of the transducers.

8 Claims, 7 Drawing Figures

INVENTOR.
R. G. FERRE

BY

ATTORNEYS

ACOUSTIC RANGE MEASURING DEVICE

BACKGROUND OF THE INVENTION

1. Field

The invention is in the field of acoustic, non-contact, distance measuring devices.

2. State of the Art

Devices of the type concerned, utilizing either digital or analog techniques, are well known, but none have been directly compatible with process controllers or digital computers. The known devices produce output signals indicating either a zero distance reading or a maximum distance reading if valid echoes are not received by the transducer, but require several cycles of operation in which to drift to these points. No indication is given that such signals are invalid. This results in the computers basing decisions on invalid information, and in process controllers erratically trying to correct falsely indicated conditions.

In multi-transducer systems there exists a time interval immediately after switching from one transducer to another during which invalid information is received because of the inherent time constant of the electronic circuitry. This invalid information has the same effect on computers and controllers as previously mentioned.

The speed of travel of an acoustic pulse through a medium can be affected by various parameters such as the temperature, pressure, humidity, etc. of the medium. The known devices have no automatic means for correcting the distance measurement for changes in acoustic pulse speed.

SUMMARY OF THE INVENTION

In accordance with the invention an acoustic distance measuring device, employing a transducer for transmitting an acoustic pulse through a transmission medium to a reflecting obstruction and for receiving a return echo therefrom, and employing timing means including a reference oscillator and an electronic counter to determine the distance of pulse travel, is provided with logic circuitry, which, if invalid data is received because of loss of echo from the transducer, provides immediately a zero distance reading for a computer connected to such a device, such reading being an indication of invalid data, as well as a separate signal, if desired, that indicates that such zero reading is invalid. The computer is thus enabled to make a decision based on what it knows is valid or invalid data. With respect to a process controller, the logic circuitry provides a repeat of the last received valid information, preventing the controller from erratically trying to correct a falsely indicated extreme condition, and at the same time, it advantageously produces an alarm signal alerting someone supervising the operation to the fact that valid echoes are not being received by the transducer.

The device may be provided with a special high-low level alarm circuit of relatively simple and inexpensive analog design which utilizes the counter and a distance display unit of the device to enable setting of the alarm points with an accuracy heretofor impossible except with very complex and expensive circuitry.

The device also may be provided with special electronic and logic circuitry to enable it to operate a multiplicity of transducers sequentially and to provide output information for each transducer. The special circuitry includes means for delaying output of any new information upon switching from one transducer to another until the circuitry of the device has had time to stabilize and provide valid information. This is important where the device is used in conjunction with a computer or process controller.

Another optional feature is the provision of an auxiliary transducer located a predetermined distance from the first transducer along with associated electronic circuitry. By comparing the distance between the two transducers and the time taken for the acoustic pulse to reach the auxiliary transducer, a signal indicative of the velocity of the acoustic pulse is obtained. This signal is then used to control the frequency of the reference oscillator, which, in turn, corrects the output for any change in acoustic pulse velocity.

THE DRAWING

Specific circuitry representing the best mode presently contemplated of carrying out the invention is shown in the accompanying drawings in which:

FIG. 1 is a block diagram indicative of the construction and operation of the basic device of the invention;

FIG. 2, a wiring diagram related to the block diagram of FIG. 1 and showing specific circuitry;

FIG. 3, a timing diagram for a portion of the device;

FIG. 4, alternative transfer controlling circuitry, the tie-in with the other circuitry of FIG 2 being indicated;

FIG. 5, a wiring diagram showing optional high-low level alarm circuitry;

FIG. 6, additional optional circuitry enabling the device to be used with a multiplicity of transducers; and FIG. 7, a combined block and wiring diagram showing optional acoustic pulse speed correction circuitry.

DETAILED DESCRIPTION OF THE ILLUSTRATED EMBODIMENT

Figure 1:
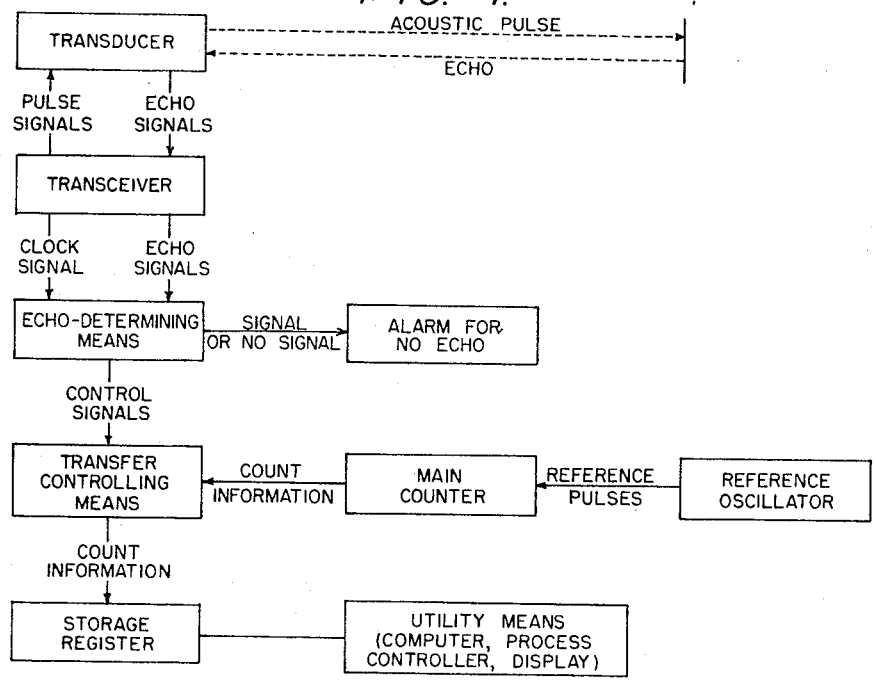
Figure 2:
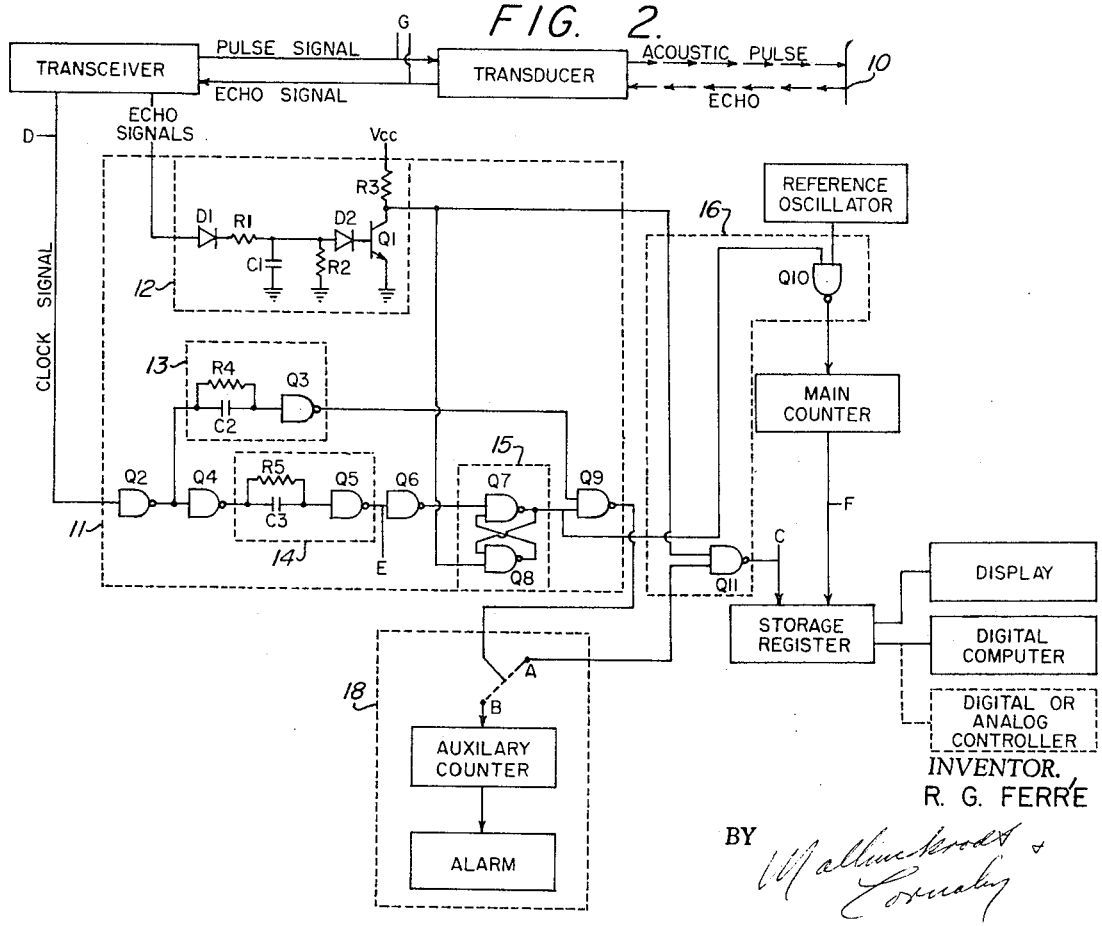

In the illustrated form of the invention, a signal from a standard acoustic or sonar distance measuring system transceiver, indicated as such in FIGS. 1 and 2, for example a U-Tech model 108 manufactured by Industrial Physics and Electronics Co., Salt Lake City, Utah, is sent to a transducer of standard type selected for use in a desired medium. The signal is there converted from electrical energy into a pulse of acoustic energy, which is directionally transmitted. A return echo is reflected from an obstruction 10 in the path of the acoustic pulse, and the return echo is received by the transducer and reconverted into an electrical signal. This electrical signal is then fed back to the transceiver, where it is processed in standard fashion and emerges from the transceiver as a pulse of sufficient amplitude to operate the remaining circuitry.

The pulse from the transceiver enters a detector, indicated generally 12, of echo-determining means designated 11, FIG. 2, through a diode D1. Resistors R1 and R2 and capacitor C1 form a simple pulse-length discriminator, which prevents detection of any short duration noise signals that may be present. Diode D1 prevents discharge of capacitor C1 back through the transceiver. The values of R1, R2 and C1 are chosen so that a pulse of the length and voltage of that pulse which is expected from the transceiver to indicate a return echo at the transducer, will build up a voltage on capacitor C1 sufficient to turn on transistor Q1. Diode D2 approximately doubles the voltage on capacitor C1 necessary to turn on transistor Q1, thus providing surer operation of the detector. When the transistor Q1 is in the off state, a voltage of Vcc is present at the collector, which is also the output of the detector. When such transistor is turned on, its collector is placed at essentially ground level. The output of the detector is thus a short pulse.

A clock pulse from the transceiver, occurring simultaneously with the transmission of the acoustic pulse from the transducer, enters the echo determining means 11 at NAND gate Q2, which acts as an inverter. The parallel combination of capacitor C2 and resistor R4, in series with NAND gate Q3, acts as a falling edge trigger, here designated 13. Thus, a short pulse is generated by Q3 at the time the inverted clock pulse from Q2 drops to "zero" logic level. The inverted clock pulse from Q2 is also reinverted by NAND gate Q4 and applied to another falling edge trigger 14, made up of resistor R5, capacitor C3, and NAND gate Q5. This causes a short pulse from Q5 at the end of the reinverted pulse, e.g., when the pulse drops to "zero" logic level. The pulse from Q5 is then inverted by NAND gate Q6, and this inverted pulse is applied to flip-flop 15 made of NAND gates Q7 and Q8. The other input of this flip-flop comes from detector 12. The flip-flop gives a logic level "one" output at Q7 and a "zero" output at Q8 when a pulse is received from Q6, and conversely, gives "zero" output at Q7 and a "one" output at Q8 when a pulse is received from the detector. The Q7 output of the flip-flop goes to NAND gate Q9, to which the output of the previously described NAND gate Q3 is also connected. If a "one" is present on both inputs to Q9, an output of "zero" will occur. Any other combination of inputs to Q9 will result in a "one" output.

Figure 3:
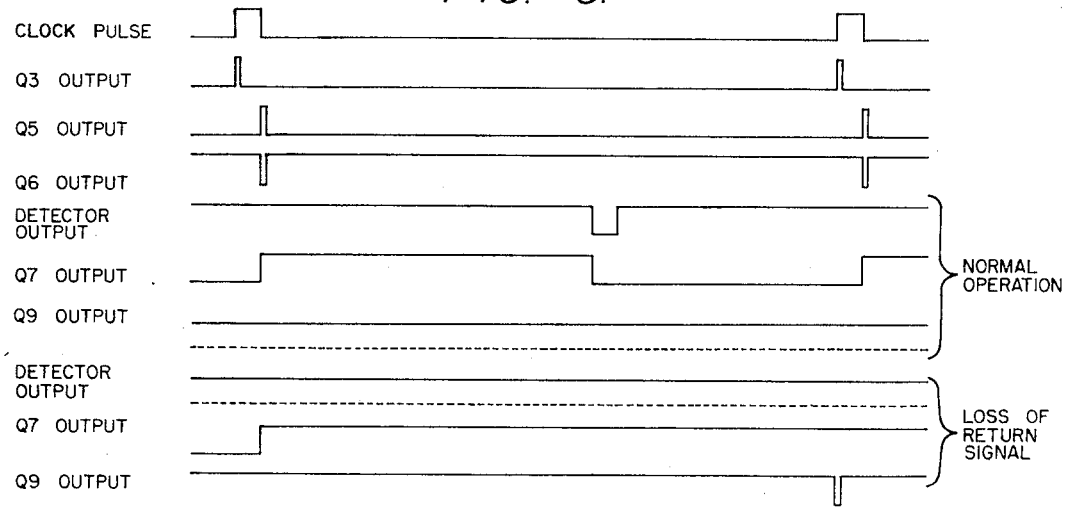

The timing diagram of FIG. 3 graphically portrays the operation of the above-described portion of the echo determining means. The clock pulse enters at Q2 causing outputs as shown from NAND gates Q3, Q5, and Q6. Under normal operation, the output of flip-flop 15 at Q7 will be "zero" at the start of the cycle. Thus the pulse from Q6 causes the flip-flop to change state, causing Q7 to give a "one" output as shown. A subsequent pulse from the detector, indicating that an echo has been received by the transducer, resets the flip-flop so as to cause a "zero" output at Q7. This cycle will then repeat itself in the same manner.

It is seen that under normal operation, only one input to Q9 is a logic level "one" signal at any time. The output of Q9, therefore, remains a constant "one". If an echo is not received by the transducer, the cycle begins in the manner as described for normal operation. However, with loss of echo, no signal is given by the detector. The flip-flop, not receiving a pulse from the detector, remains with a "one" output at Q7. When the next clock pulse enters at Q2 and Q3 sends a "one" pulse to Q9 (Q9 now having two simultaneous logic level "one" inputs) the output of Q9 drops to "zero" for the duration of the pulse from Q3. Q9 will continue to give an output pulse at the beginning of each cycle immediately following one for which an echo had not been received. If an echo is now received, the signal from the detector will reset flip-flop 15 causing a "zero" output at Q7. Operation then continues in normal manner.

Referring again to FIG. 2, the output of Q7 is also connected to NAND gate Q10 in the transfer controlling means 16. The second input to Q10 is connected to the output of a standard reference oscillator. The frequency of such oscillator is selected to be a direct function of the speed of travel of the acoustic pulse through the medium. The number of pulses occurring between the time of transmission of the acoustic pulse and the time of receipt of the return echo is directly proportional to the distance traveled by the acoustic pulse. The output of the pulse generator is continuously fed to gate Q10, but only when there is a logic level "one" present on the second input to Q10 will the pulses be passed by Q10. When flip-flop 15 gives a "one" output at Q7 coincidently with the end of the clock pulse, the output of Q10 becomes a series of pulses coincident with, but inverted from, the pulses received from the reference oscillator. These pulses are then counted by a main counter, which may be any standard type of electronic counter. When, at the time of receipt of a signal from the detector indicating a return echo at the transducer, the flip-flop output at Q7 drops to "zero," Q10 no longer passes the pulses from the reference oscillator. The pulses counted by the main counter are those that occurred between the time of transmission and receipt of return echo of the acoustic pulse. Such main counter is reset to zero at each clock pulse, so a new count is made during each cycle. Under normal operation, a "zero" pulse from the detector, given when an echo is received by the transducer, causes Q11 to give a "one" output pulse, which is connected to a standard digital storage register in the usual manner such that the storage register accepts and stores the information contained in the main counter.

Figure 4:
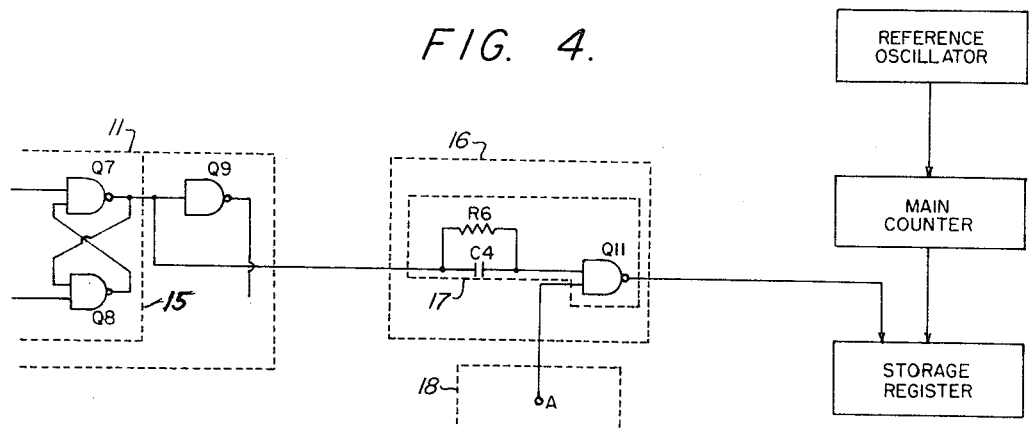

The same information may be transferred to the storage register by the modified circuitry shown in FIG. 4. The NAND gate Q10 is eliminated. The counter counts the pulses from the reference oscillator continuously. The input to NAND gate Q11 is not connected to the detector. Instead, a resistor R6 and a capacitor C4 are connected in parallel to one input of Q11, so, in conjunction with Q11, form a falling edge trigger 17. This falling edge trigger is connected to flip-flop 15 output at Q7. As before, when the detector 11 output is received by flip-flop 15, the output of such flip-flop at Q7 drops to "zero." This causes falling edge trigger 17 to give a short level "one" output pulse at Q11. This pulse causes the storage register at that instant to accept and store the count of the main counter. Even though such main counter is continuously counting, the count contained at the moment of storage, coincident with the receipt of the return echo, will represent the number of pulses from the reference oscillator that occurred between the time of transmission of the acoustic pulse (the counter is still reset at this time), and receipt of the return echo.

The information contained in the storage register is visually displayed, if desired, and may also be sent to a digital computer, a digital controller, or an analog controller equipped with a standard digital to analog converter.

The output of NAND gate Q9 enters the alarm for no echo, see 18, FIG. 2, and may be switched between two alternate positions. Position A provides for causing the output of the storage register to immediately indicate zero, zero, zero, if an echo is not received by the transducer. This output is used when the device is connected to a computer programed to recognize such signal as an indication of non-receipt of a return echo. If an echo is not received by the transducer, no pulse is given by the detector. As described above, in this situation the output of Q9 drops to "zero" upon the receipt by Q2 of the clock pulse from the transceiver. The output of Q9 is connected to an input of Q11, so that the "zero" pulse from Q9 causes a "one" pulse on the output of Q11. This pulse is sent to the storage register. Since the main counter is reset with each clock pulse and since the described output pulse from Q11 occurs coincidently with the clock pulse, a count of zero, zero, zero is transferred to the storage register, and in turn to the computer and/or display.

Position B provides in case a return echo is not received by the transducer, for a continued output by the storage register of the last received valid information from the counter and provides a separate output of an alarm signal. This type of output is mainly for use when the device is connected to process controllers, as indicated in the alternative, but may also be utilized by digital computers programmed to use such output.

In this position, if an echo is not received, no signal is given to the storage register. The controller continues to receive the last valid information from the main counter, which remains in the storage register. The signal from Q9 in this position is connected to an auxiliary binary counter, which counts the number of signals received from Q9 corresponding to the number of cycles in which echoes are not received. One stage of the output of the auxilairy counter is connected to an alarm which may be a bell, light, etc. By choosing which stage of said counter to connect to the alarm, such alarm may easily be activated after one, two, four, eight, or 16 cycles during which echoes have not been received. The auxiliary counter is reset each time a pulse from the detector is received, so that the alarm is activated only if the set number of cycles with unreceived echoes occur consecutively.

Figure 5:
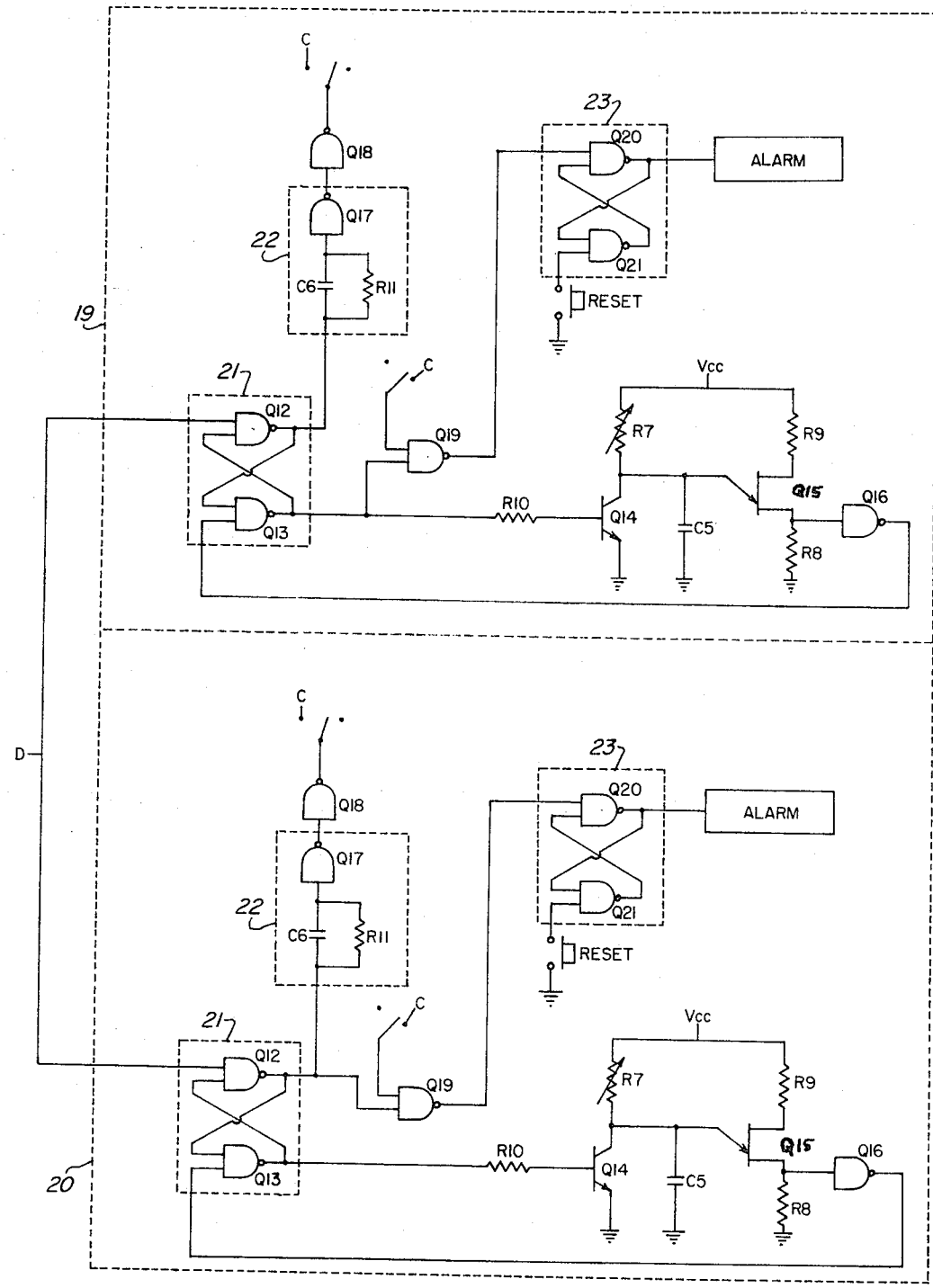

This device may be provided with a special alarm circuit, such as is shown in FIG. 5. A clock pulse from the transceiver in the device of FIG. 2, is connected to such alarm circuit at point D. The alarm circuit comprises a low level alarm section 19 and a high level alarm section 20.

The clock pulse from the transceiver sets a flip-flop 21 in low level alarm section 19. Such flip-flop is made up of NAND gates Q12 and Q13 so that a logic level "one" output is present at Q12 and logic level "zero"- 'output at Q13. With the output of Q13 at "zero," transistor 14 is turned off, allowing capacitor C5 to charge through variable resistor R7. When the voltage on C5 reaches the trigger voltage of unijunction transistor Q15, such transistor conducts while C5 discharges, thereby causing a voltage pulse to appear across R8.

The desired alarm point is set by adjusting the time interval between the start pulse and the pulse occurring across R8. This is accomplished by varying the resistance of variable resistor R7 which controls the time required for C5 to reach the trigger voltage of Q15. R9 is a bias resistor for unijunction Q15.

The pulse occurring across R8 is inverted by NAND gate 16 and is then fed to flip-flop 21 at Q13. This pulse resets flip-flop 21, so that a "one" appears at the output of Q13 and a "zero" appears at the output of Q12. The voltage from Q13 turns on transistor Q14, which grounds capacitor C5 thus preventing unijunction transistor Q15 from again triggering. R10 limits the current flowing to transistor Q14. The output of Q12 is applied to a falling edge trigger 22 made up of C5, R11, and Q17. When the output of flip-flop 21 at Q12 drops from a level "one" to "zero" in response to the pulse from Q16, a pulse is generated by falling edge trigger 22. This pulse is inverted by NAND gate 18 and is used only during the setting of the alarm point, at which time it is connected directly to the storage register of the device of FIG. 2 at point C. When connected to such storage register, a pulse from Q18 causes a transfer from the main counter to the storage register of the number of pulses received from the reference oscillator between the time of the clock pulse and the triggering of unijunction transistor Q15. This is visually displayed by the device in normal fashion and gives an accurate indication of the set point of the alarm. After setting the alarm, the output of Q18 is disconnected from point C and the input to NAND gate Q19 is connected to point C.

During normal operation of the low level circuitry, the clock pulse applied to flip-flop 21 causes a "one" output at Q13. This output, along with initiating the charging of capacitor C5 as described above, is applied to one input of NAND gate Q19. When unijunction transistor Q15 triggers, causing the flip-flop output at Q13 to go to "zero," a "one" is no longer applied to such input of Q19. Q19 gives a "one" output unless a "one" is present on both inputs simultaneously. A "one" pulse will occur at point C when an echo has been received by the transducer. If this pulse at point C occurs after the triggering of unijunction Q15, the condition if the measured distance is greater than the pre-set minimum, Q19 will not have simultaneous "one" inputs, so no change in the output of Q19 will occur. If the pulse at point C occurs before the triggering of unijunction Q15, the condition if the measured distance is less than the present minimum, simultaneous "ones" will occur on the inputs to Q19 and cause its output to drop to "zero." This causes a second flip-flop 23 made up of NAND gates Q20 and Q21 to change states causing activation of an alarm. The alarm may be a bell, light, etc. To reset flip-flop 23 and turn off the alarm, a manual reset button must be depressed.

The high-level alarm section 20 of the alarm circuit is made of identical components as and functions identically to the low level alarm section 19, except that one input of the NAND gate Q19 of this high-level section is connected to the output of flip-flop 21 at Q12 rather than at Q13. A "zero" is thus present on this input during the time between the clock pulse and the triggering of unijunction Q15, and "one" is present after the triggering of the unijunction. This is the converse of the condition created on corresponding input to Q19 in the low level portion. The second input to Q19 is similarly connected to point C If a signal is present at point C before the unijunction triggers, the condition if the distance measured is less than the set maximum, both inputs to Q19 are not simultaneously "one," and no change in output of Q19 occurs. If the signal at point A occurs after the triggering of unijunction Q15, the condition if the distance measured is greater than the pre-set maximum, simultaneously "ones" occur on the input to Q19 and its output drops to " zero," causing the flip-flop 23 made up of NAND gates Q20 and Q21, to change states and activate the alarm. This flip-flop must similarly be reset by a manual reset button.

Figure 6:
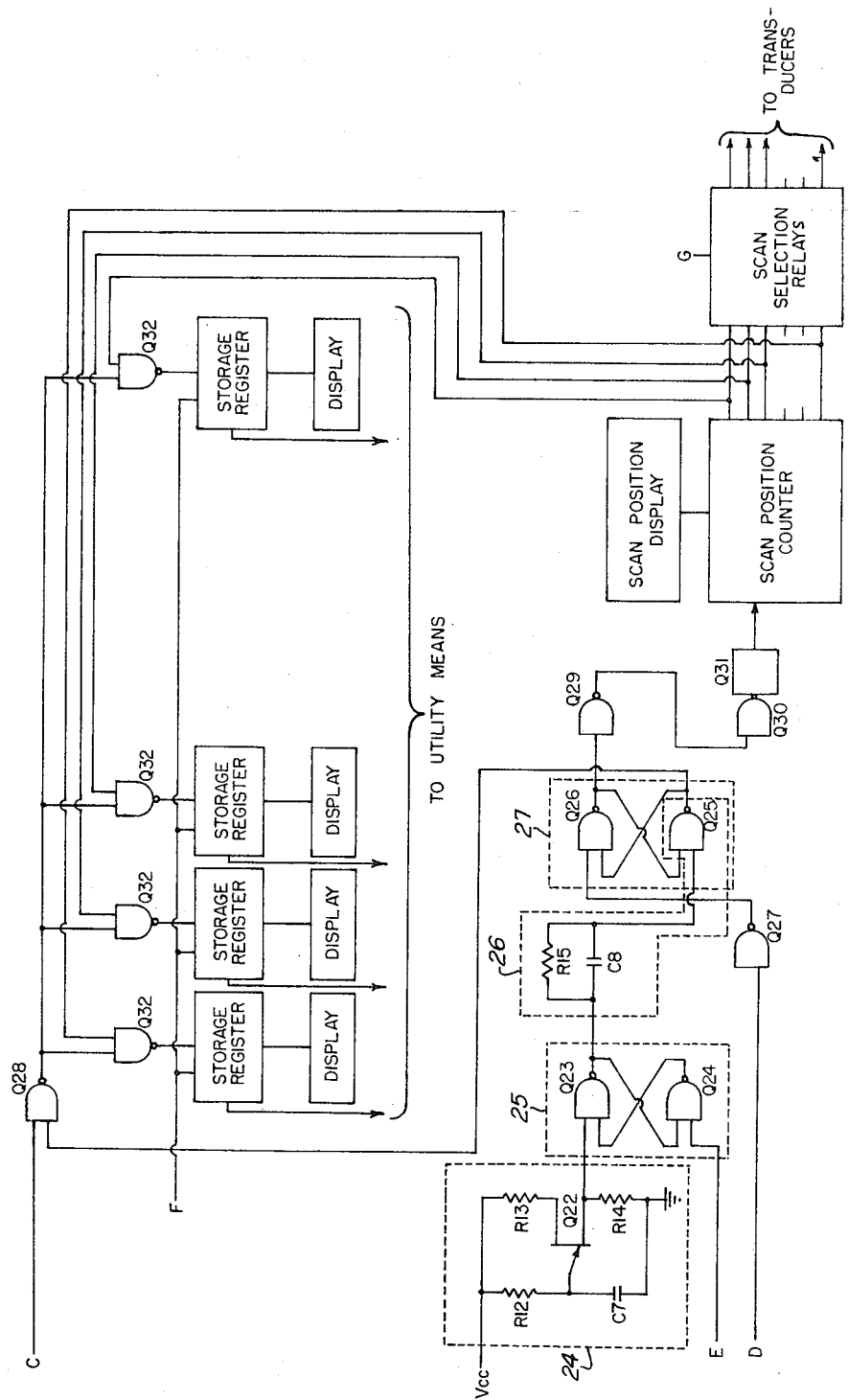

The device may also be provided with circuitry to enable it to operate sequentially a multiplicity of transducers and to provide output information for each transducer. FIG. 6 shows such circuitry with appropriate interconnection to FIG. 2 indicated by letter.

The multi-transducer circuitry contains its own scan cycle timer 24, a standard unijunction relaxation oscillator made up of unijunction transistor Q22, resistors R12, R13, and R14, and capacitor C7. The frequency of the scan cycle timer 24 is set so that several consecutive transmission cycles of acoustic pulses will occur for each transducer. The pulses from the scan cycle timer are fed to a flip-flop 25 made up of NAND gates Q23 and Q24 at Q23. The input at Q24 to flip-flop 25 comes from point E of FIG. 2. A pulse occurs at point E at the end of each clock pulse from the transceiver. The flip-flop 25 operates to synchronize the scan cycle timer and the clock pulses from the transceiver. When the pulse from the scan cycle timer is applied at Q23, the flip-flop produces a logic level "one" output at Q23. When a pulse from point E is applied at Q24, the flip-flop gives a logic level "zero" output at Q23. Resistor R15, capacitor C8 and NAND gate Q25 act as a falling edge trigger 26 which changes the state of flip-flop 27 causing Q25 to give a "one" output, when the output of Q23 drops to "zero." The other input of flip-flop 27 at Q26 is connected through NAND gate Q27, which acts as an inverter, to the clock pulse from the transceiver at point D. The inverted clock pulse applied to Q26 causes a "one" output of Q26 and causes a "zero" output of Q25, this occurs for the duration of the one cycle of the transceiver immediately following a pulse from the scan cycle timer. This is true also of the "zero" output of Q26. The "one" output of Q25 is applied to NAND gate Q28 which is also connected at point C of FIG. 2 to receive a pulse upon receipt of a return echo from the transducer. Only with a "one" applied from Q25, will Q28 give a pulse output when a pulse is received from point C. Since the output pulse from Q28 is used to achieve distance information transfer to the storage register as will be described, such transfer coinciding with the output pulse of Q28 will occur only during the last cycle of the several cycles of transmission of acoustic pulses provided for during each cycle of the scan timer. This allows time for the internal circuitry of the transceiver to adjust to the different signal level present at a newly switched to transducer ensuring that only valid distance information is transferred to the storage register.

The output of Q26 is inverted by NAND gate Q29 and again inverted by NAND gate Q30 and then applied to a one-shot Q31 with delay time of less than the time of one cycle of the transceiver but long enough to ensure that a return echo has reached the transducer. The output of the one-shot enters a standard binary counter herein called the scan-counter, connected in standard fashion so as to count to a number equal to the number of multiple transducers used, and then to reset and begin the count again. Each pulse from the scan cycle timer causes, in the manner described, a delayed pulse to enter the scan-counter. The output of the scan-counter is used to activate one of a multiplicity of relays which in turn connects one of the multiplicity of transducers to the transceiver at point G. One relay, and its associated transducer, is activated for each count of the scan-counter. The output of the scan-counter also goes to one of a multiplicity of NAND gates indicated Q32, each connected to a storage register. One NAND gate Q32 receives a voltage on its input from the scan-counter, for each count of said counter. The count of the scan-counter may also be displayed if desired, as a visual indication of which of the multiplicity of transducers is connected to the transceiver at the particular time.

A multiplicity of storage registers equal in number to the multiplicity of transducers, is connected in standard fashion in parallel through point F to the main counter of FIG. 2. Each of the storage registers has an input connection from a NAND gate Q32 such that an output pulse from such NAND gate will cause the storage register to accept and store the information from the main counter. The output pulse from such NAND gate will occur when both an output voltage from the scan-counter and a pulse from Q28 is present on its inputs. Thus, only such NAND gate to which the scan-counter provides an input will cause its corresponding storage register to enter the distance information from the main counter upon receipt of the pulse from Q48. The information in the storage registers may be visually displayed and directly connected to either a computer or process controller as previously described with the single transducer circuitry of FIG. 2.

Figure 7:
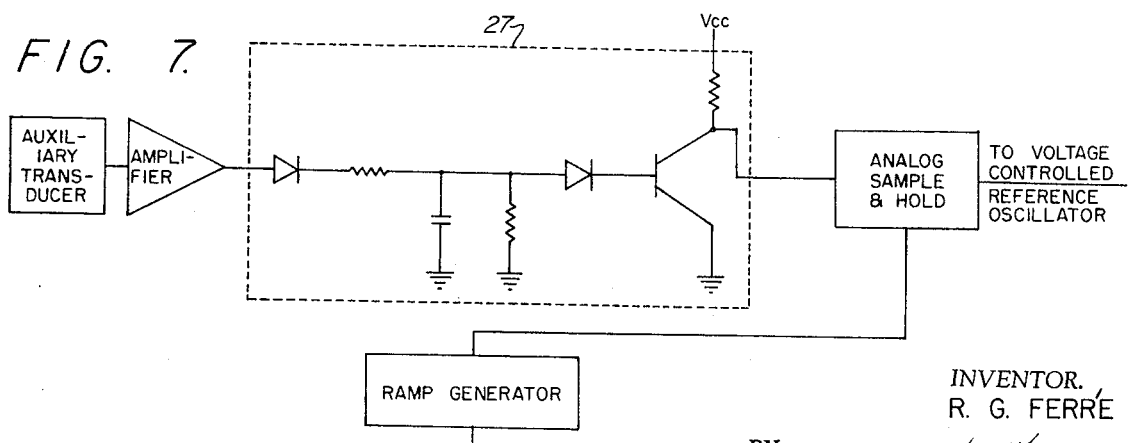

The device may optionally be provided with a standard voltage controlled reference oscillator and associated electronic circuitry in place of the indicated reference oscillator to correct for any changes in the sound velocity of the acoustic pulse medium. The compensation circuitry is shown in FIG. 7.

An auxiliary transducer is located a known distance from the transducer of FIG. 2. A small portion of the acoustic pulse generated by the transducer OF FIG. 2 is received by the auxiliary transducer and converted into electrical energy. The electrical signal from such auxiliary transducer is amplified in a standard amplifier and then sent to a detector 27. This detector works identically to detector 12 of FIG. 2, giving an output pulse droping to zero from the normal output level of Vcc. This output pulse is connected to a standard analog sample and hold circuit which is also connected to a standard voltage ramp generator. The voltage ramp generator is reset to its initial value by each clock pulse from the transceiver taken at point D. From its initial value, the output of the ramp generator is an increasing voltage. At the instant the pulse from the detector is received by the sample and hold circuit, the value of the voltage ramp is entered into the circuit. The output of the sample and hold circuit is a D.C. voltage of the value of the ramp voltage at the time it was entered into such circuit. This D.C. voltage from the sample and hold circuit is connected in the normal manner to the standard voltage controlled oscillator, which is a direct substitute for the reference oscillator of FIG. 2, and as such, determines the frequency of the oscillator. Since the frequency of the oscillator is designed to be a direct function of the speed of travel of the acoustic pulse so that the number of pulses occurring between the transmission and the return echo of such pulse is directly proportional to the distance traveled by such pulse, a correction in the frequency of the oscillator with change in pulse speed will serve to keep the direct proportaionality, so accurate distance measurements are always obtained.

Whereas this invention is here illustrated and described with respect to certain preferred forms thereof, it is to be understood that many variations are possible without departing from the inventive concepts particularly pointed out in the claims.

I claim:

1. An acoustic range measuring device, capable of direct connection to digital computers and digital controllers as well as analog controllers, comprising a transducer for transmitting acoustic pulses and for receiving return echos therefrom; a transceiver for supplying electric signals to said transducer and for processing electric signals representing return echos; a reference oscillator for generating pulses of predetermined frequency; an electronic counter for counting the pulses from the reference oscillator that occur between the time of transmission of an acoustic pulse and the receipt of a return echo of said acoustic pulse; means for storing the count information; utility means responsive to said count information; means for determining whether or not an echo is received by the transducer; means for controlling the transfer of information from the counting means to the count storing means in accordance with the nature of said output means if and when the transducer receives a return echo for any given acoustic pulse, said transfer controlling means including means compirising a NAND gate for controlling the transmission of reference pulses from the oscillator to the electronic counter; and means for providing an alarm signal if such a return echo is not received.

2. An acoustic range measuring device in accordance with claim 1, wherein the transfer controlling means comprises a falling edge trigger and a NAND gate.

3. An acoustic range measuring device in accordance with claim 1, wherein the means for providing an alarm signal comprises means for setting the means for storing the count information to a predetermined count.

4. An acoustic range measuring device in accordance with claim 3, wherein the predetermined count is zero.

5. An acoustic range measuring device in accordance with claim 1, wherein the means for providing an alarm signal includes means for maintaining the last valid count information in the means for storing the count information.

6. An acoustic range measuring device capable of direct connection to digital computers and digital controllers as well as analog controllers, comprising a transducer for transmitting acoustic pulses and for receiving return echos therefrom; a transceiver for supplying electric signals to said transducer and for processing electric signals representing return echos; a reference oscillator for generating pulses of predetermined frequency; an electronic counter for counting the pulses from the reference oscillator that occur between the time of transmission of an acoustic pulse and the receipt of a return echo of said acoustic pulse; means for storing the count information; utility means responsive to said count information; means for determining whether or not an echo is received by the transducer; means for transferring information from the counting means to the count storing means in accordance with the nature of said output means if and when the transducer receives a return echo for any given acoustic pulse; means for providing an alarm signal if such a return echo is not received; means for giving an alarm signal if a preset range is exceeded or not reached, said means comprising two variable analog timers; means for connecting said timers to the means for storing the count information during setting of said timers; means for determining if the time from transmission of an acoustic pulse to receipt of a return echo thereof is greater than or less then the preset time of said analog timer; and alarm signal means arranged for actuation by said time determining means.

7. An acoustic range measuring device capable of direct connection to digital computers and digital controllers as well as analog controllers, comprising a transducer for transmitting acoustic pulses and for receiving return echos therefrom; a transceiver for supplying electric signals to said transducer and for processing electric signals representing return echos; a reference oscillator for generating pulses of predetermined frequency; an electronic counter for counting the pulses from the reference oscillator that occur between the time of transmission of an acoustic pulse and the receipt of a return echo of said acoustic pulse; means for storing the count information; utility means responsive to said count information; means for transferring information from the counting means to the count storing means in accordance with the nature of said output means if and when the transducer receives a return echo for any given acoustic pulse; means for providing an alarm signal if such a return echo is not received; a multiplicity of transducers and count storing means; means for sequentially operating the multiplicity of transducers, said means comprising a timer; means for synchronizing the output of said timer with the sending of the signal from the transceiver to the transducer; scan-counting means for selection of one or another of the said multiplicity of transducers and of a corresponding means for storing the count information to the selected means for storing count information; and delay means to activate said scan-counter and said transfer means upon a delayed signal from said synchronizing means.

8. An acoustic range measuring device capable of direct connection to digital computers and digital controllers as well as analog controllers, comprising a transducer for transmitting acoustic pulses and for receiving return echos therefrom; a transceiver for supplying electric signals to said transducer and for processing electric signals representing return echos; a voltage-controlled oscillator for generating pulses of predetermined frequency; an electronic counter for counting the pulses from the reference oscillator that occur between the time of transmission of an acoustic pulse and the receipt of a return echo of said acoustic pulse; means for storing the count information; utility means responsive to said count information; means for determining whether or not an echo is received by the transducer; means for transferring information from the counting means to the count storing means in accordance with the nature of said output means if and when the transducer receives a return echo for any given acoustic pulse; means for providing an alarm signal if such a return echo is not received; means for automatic compensation of the reference pulse frequency with changes in the acoustic pulse velocity, said means comprising first and second transducers positioned a predetermined distance apart such that the said second transducer will receive only a portion of the transmitted acoustic pulse from the said first transducer; an amplifier arranged to amplify the electrical signals from said second transducer; a detector to determine, and to produce a relatively short output pulse, when a signal from said second transducer represents receipt by said second transducer of said acoustic pulse; a voltage ramp generator for providing an increasing voltage with increasing time and which is reset with the transmission of the acoustic pulse from said first transducer; and a sample and hold circuit which stores and applies to said voltage-controlled oscillator the voltage value of said voltage ramp at the time of receipt of said output pulse from said detector.

* * * * *